(12) United States Patent
Milione (10) Patent No.: US 10,432,307 B2
(45) Date of Patent: Oct. 1, 2019

(54) FREE-SPACE OPTICAL COMMUNICATION USING HERMITE-GAUSSIAN MODES

(71) Applicant: NEC Laboratories America, Inc., Princeton, NJ (US)

(72) Inventor: Giovanni Milione, Franklin Square, NY (US)

(73) Assignee: NEC Corporation (JP)

( * ) Notice: Subject to any disclaimer, the term of this patent is extended or adjusted under 35 U.S.C. 154(b) by 0 days.

(21) Appl. No.: 16/048,155

(22) Filed: Jul. 27, 2018

(65) Prior Publication Data
US 2019/0036602 A1 Jan. 31, 2019

Related U.S. Application Data

(60) Provisional application No. 62/537,711, filed on Jul. 27, 2017.

(51) Int. Cl.
*H04J 14/04* (2006.01)
*H04B 10/11* (2013.01)
*H04B 10/516* (2013.01)

(52) U.S. Cl.
CPC ........... *H04B 10/11* (2013.01); *H04B 10/516* (2013.01); *H04J 14/04* (2013.01)

(58) Field of Classification Search
CPC ......... H04B 10/11; H04B 10/516; H04J 14/04
USPC ................... 398/43–103, 118–131, 140–172
See application file for complete search history.

(56) References Cited

U.S. PATENT DOCUMENTS

| | | | | |
|---|---|---|---|---|
| 8,244,137 | B1* | 8/2012 | Chen ................... | H04B 10/1141 398/118 |
| 2010/0329671 | A1* | 12/2010 | Essiambre ............... | G02B 6/14 398/44 |
| 2012/0251105 | A1* | 10/2012 | Kwok ................... | G02B 6/0288 398/44 |
| 2014/0199066 | A1* | 7/2014 | Martelli ............. | H04B 10/2581 398/44 |
| 2014/0205283 | A1* | 7/2014 | Djordjevic ......... | H04B 10/2581 398/44 |
| 2014/0355624 | A1* | 12/2014 | Li ........................... | H04L 27/00 370/468 |
| 2015/0030325 | A1* | 1/2015 | Chang ..................... | H04J 14/04 398/44 |
| 2015/0104139 | A1* | 4/2015 | Brunet ............... | G02B 6/03611 385/124 |
| 2015/0349910 | A1* | 12/2015 | Huang .................... | H04J 14/00 398/44 |
| 2016/0028479 | A1* | 1/2016 | Ren .................... | H04B 10/1121 398/43 |
| 2016/0127073 | A1* | 5/2016 | Ashrafi ................ | H04B 10/516 398/44 |
| 2017/0138851 | A1* | 5/2017 | Ashrafi ................ | G01N 33/487 |
| 2017/0214465 | A1* | 7/2017 | Milione ............. | H04B 10/2581 |

(Continued)

OTHER PUBLICATIONS

Saghafi et al, Characterizing elegant and standard Hermite Gaussian beam modes, May 2001, Optics Communications, pp. 173-179. (Year: 2001).*

*Primary Examiner* — Dibson J Sanchez
(74) *Attorney, Agent, or Firm* — Joseph Kolodka (57) ABSTRACT

Aspects of the present disclosure describe systems, methods, and structures for free-space optical communications using Hermite-Gaussian modes resulting in advantageous performance over prior art systems particularly with respect to lateral misalignment.

13 Claims, 10 Drawing Sheets

(56) References Cited

U.S. PATENT DOCUMENTS

| | | | | |
|---|---|---|---|---|
| 2017/0230115 A1* | 8/2017 | Ashrafi | ............ | H04B 10/2504 |
| 2018/0034556 A1* | 2/2018 | Willner | ............ | H04B 10/1121 |
| 2018/0052102 A1* | 2/2018 | Yaman | ................. | G01H 9/004 |
| 2018/0069631 A1* | 3/2018 | Ashrafi | ............ | H04B 10/2507 |
| 2018/0167144 A1* | 6/2018 | Howlader | ............ | H04B 10/112 |
| 2018/0167703 A1* | 6/2018 | Willner | ................ | H04Q 11/00 |
| 2018/0306723 A1* | 10/2018 | Ashrafi | ............ | G01N 21/6428 |

* cited by examiner

FREE-SPACE OPTICAL COMMUNICATION USING HERMITE-GAUSSIAN MODES

CROSS REFERENCE TO RELATED APPLCIATION

This application claims the benefit of U.S. Provisional Patent Application Ser. No. 62/537,711 filed 27 Jul. 2017 the entire content of which is incorporated by reference as if set forth at length herein.

TECHNICAL FIELD

This disclosure relates generally to optical communications and in particular to free-space optical communications using Hermite-Gaussian modes.

BACKGROUND

The networked and mobile computing environment that defines much of contemporary society has provided innumerable convenience and productivity benefits. Given such benefits—society have become increasingly dependent upon services delivered thereon. Perhaps unknown to many, underlying these services are vast optical networks transporting incalculable volumes of data.

Free-space optical communication is the optical transmission of data over free-space (i.e., air/vacuum) using light as the transmission medium. In contrast to optical communication over optical fiber, free-space optical communication is employed in those locations where optical fibers are not already—or able to be—deployed. As such, free-space optical communication underlies many existing communications facilities including burgeoning applications such as deep space communications for NASA, the European Space Agency's European Data Relay System wherein geosynchronous satellites transmit data between satellites, spacecraft, unmanned aerial vehicles, and ground stations and, Facebook's and Google's Internet.org project and Project Loon, respectively, which attempt to provide otherwise inaccessible Internet service across the globe.

As society's communications data requirements continue to unabatedly increase, there exists a compelling need to increase the data speed of free-space optical communication. Given the utility, importance, and necessity of free-space optical communications and networks constructed therefrom, systems, methods, and structures that enhance their data carrying capabilities would represent a welcome addition to the art.

SUMMARY

An advance in the art is made according to aspects of the present disclosure directed to systems, methods, and structures for free-space optical communications. In sharp contrast to the prior art which employed orbital angular momentum (OAM) modes, systems, methods and structures according to aspects of the present disclosure employ a subset of Hermite-Gaussian modes that advantageously exhibit less crosstalk when laterally misaligned thereby that providing increased data speed with comparatively less data errors.

Viewed from one aspect, systems, methods, and structures according to aspects of the present disclosure include a free-space optical communications system comprising: a data transmitter; a data receiver; and a free-space channel optically connecting the data transmitter to the data receiver; wherein the data transmitter includes: N-lasers that generate N-laser beams; N-modulators that modulate the N-laser beams producing N-data streams; a mode multiplexer that converts the N-data streams into N-Hermite-Gaussian modes and combine them into a single laser beam for transmission over the free-space channel to the data receiver.

As will be appreciated, and according to another aspect of the present disclosure, the N-Hermite-Gaussian modes are spatial patterns of light where the pattern is perpendicular to the light's direction of propagation.

Still according to yet another aspect of the present disclosure, the spatial patterns may be solutions to the electromagnetic wave equation in rectangular coordinates (x,y,z). At z=0, the amplitudes of Hermite-Gaussian modes are given by the equation:

$$HG_{mn}(x, y) = c_{mn} H_m\left(\frac{x\sqrt{2}}{w}\right) H_n\left(\frac{y\sqrt{2}}{w}\right) \exp\left(\frac{-x^2 - y^2}{w^2}\right),$$

where $c_{mn}$ are normalized coefficients, $H_m(\ldots)$ and $H_n(\ldots)$ are Hermite polynomials, w is a waist size of the modes, and m and n are indices of the Hermite-Gaussian modes corresponding to the x and y directions, respectively, where m, n=0,1,2, ..., .

Finally, according to still further aspects of the present disclosure, the N-Hermite-Gaussian modes may be a special subset of the Hermite-Gaussian modes and are given by the equation:

$$\{HG_{m0}(x,y), HG_{0n}(x,y)\},$$

where the indices of each Hermite-Gaussian mode are given by m=0 and n≠0 or, m≠0 and n=0.

BRIEF DESCRIPTION OF THE DRAWING

A more complete understanding of the present disclosure may be realized by reference to the accompanying drawing in which:

FIG. 1(A) and FIG. 1(B) are a series of intensity and phase profiles of: FIG. 1(A) LG modes and FIG. 1(B), HG modes according to aspects of the present disclosure;

FIG. 2(B) and FIG. 2(C) show a holographic filters Tx translated along the x-direction to with respect to the central axis of Tx wherein the position of the beam incident on Rx is shown as the dashed circle while

FIG. 3(A) and FIG. 3(B) are plots showing the results of one-dimensional translation and in particular when offsetting the measuring hologram along the x-direction, FIG. 3(A) shows the mode-dependent loss incurred on the transmitted LG and HG modes, while

FIG. 4(A) and FIG. 4(B) and FIG. 4(C) are plots illustrating experimental results for random two-dimensional offsets wherein

The illustrative embodiments are described more fully by the Figures and detailed description. Embodiments according to this disclosure may, however, be embodied in various forms and are not limited to specific or illustrative embodiments described in the drawing and detailed description.

DESCRIPTION

The following merely illustrates the principles of the disclosure. It will thus be appreciated that those skilled in the art will be able to devise various arrangements which, although not explicitly described or shown herein, embody the principles of the disclosure and are included within its spirit and scope.

Furthermore, all examples and conditional language recited herein are intended to be only for pedagogical purposes to aid the reader in understanding the principles of the disclosure and the concepts contributed by the inventor(s) to furthering the art and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that any block diagrams herein represent conceptual views of illustrative circuitry embodying the principles of the disclosure.

Unless otherwise explicitly specified herein, the FIGs comprising the drawing are not drawn to scale.

Figure 1A:
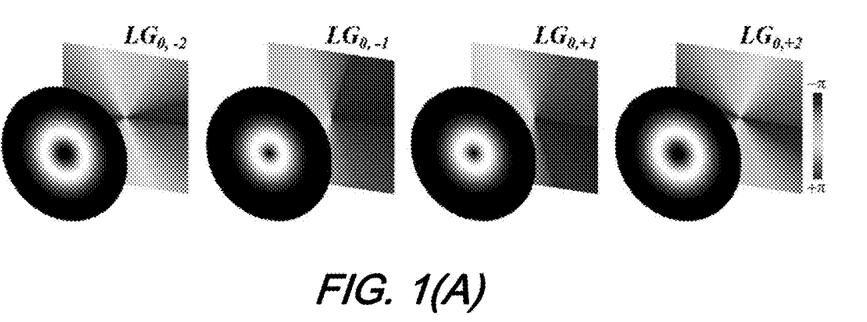
Figure 1B:
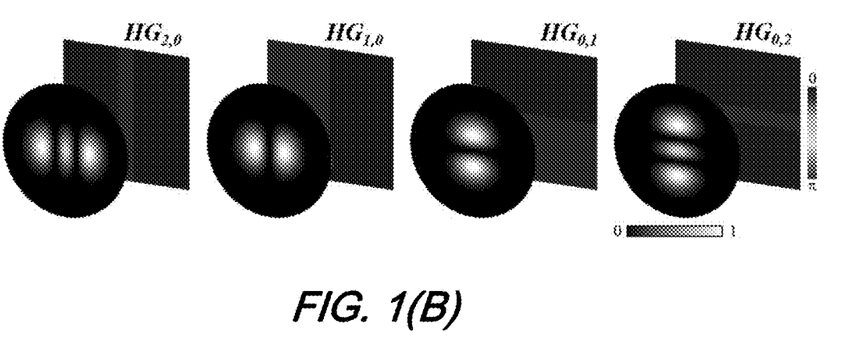

By way of some additional background, we begin by noting that a spatial mode with respect to optical communications is a spatial pattern of light wherein the pattern is in a plane perpendicular to the propagation direction of the light. The mathematical function that describes the spatial pattern is a solution to an electromagnetic wave equation. As will be known and understood by those skilled in the art, such spatial modes include Laguerre-Gaussian modes and Hermite-Gaussian (HG) modes—being solutions to wave equation in cylindrical and rectangular coordinates, respectively, Recently, there has been an increased interest in using spatial modes referred to as orbital angular momentum (OAM) modes for mode division multiplexing. OAM modes are a subset of Laguerre-Gaussian modes ($LG_{0,l}$) that carry a well-defined OAM per photon and are characterized by a central null intensity and azimuthally varying phase as shown in FIG. 1(A) and FIG. 1(B). Effectively, OAM modes are light beams that propagate in the z-direction and have an azimuthally varying phase given by $\exp(\iota l\varphi)$ ($l= \ldots -2,-1,0,+1,+2,\ldots$) where, $(r,\varphi,z)$ are cylindrical coordinates and $\varphi$ is the azimuthal coordinate. Of interest to free-space optical communications is the fact that it has been shown that OAM modes can be used as states that encode data or channels that carry data (mode-division multiplexing).

More recently, real-world experiments have shown that a major cause of data errors when using OAM modes for free-space optical communication is turbulence induced tip/tilt, leading to misalignment of the data transmitter and receiver. Two important metrics that quantify the errors incurred during transmission is the mode crosstalk and mode-dependent loss. The former is defined as the transfer of energy from one mode to another, while the latter is the loss of power of each mode. In a free-space link where the central axes of the transmitter and receiver are aligned, misalignment occurs because of angular errors, tip/tilt, due to external perturbation by the medium of propagation (atmospheric turbulence for example).

Interestingly, the choice of spatial modes for free-space optical communication is not restricted to the space of OAM modes since the suitability of a mode set for communication is determined largely by one's ability to unambiguously distinguish the elements of the set. In this sense, modes sets having equivalent numbers of elements can be compared in terms of mode crosstalk and mode-dependent loss. Theoretically, this implies that the ideal mode set for a communication through a given perturbing medium, is one for which the elements are eigenmodes of the medium. For example, a medium causing a rotation of the beam will have OAM as eigenmodes due to their rotational symmetry.

For a medium such as atmospheric turbulence which causes spatial offset, there is no mode set that comprises eigenmodes, i.e., that are generally invariant under lateral translation with respect to the detection system. However, we show, theoretically and experimentally, that Hermite-Gaussian (HG) modes are, within the finite size of the detection aperture, invariant under translations along the x or y direction when measured with a binary phase element.

As a result, in the context of free-space communication, we show that, when compared to their equivalent LG modes with identical beam propagation factor $M^2$, our subset of HG modes has on average, surprisingly, 17% less mode dependent loss and 66% less mode crosstalk for random offsets normally distributed around the transmitter axis with standard deviation that is 2× the beam waist size.

Theoretical Discussion

Let's begin by theoretically examining the mode crosstalk and mode-dependent loss of transmitted and received HG modes in a misaligned free space optical communication link. The electric field amplitudes of HG modes that propagate in the z-direction are given by:

$$HG_{m,n}(x, y) = c_{m,n} H_m\left(\frac{x\sqrt{2}}{\omega}\right)\exp\left(-\frac{x^2}{\omega^2}\right) \times H_n\left(\frac{y\sqrt{2}}{\omega}\right)\exp\left(-\frac{y^2}{\omega^2}\right), \quad [1]$$

where, (x, y, z) are rectangular coordinates, $c_{m,n}$ are normalized coefficients, $\omega$ is the beam waist size and, $H_m(\cdot)$ and $H_n(\cdot)$ are generalized Hermite polynomials of index m, n. The intensity and phase profiles of some OAM and HG beams are shown in FIG. 1(A) and FIG. 1(B). We will label the HG modes that are transmitted (generated) and received (detected) by $HG_{m^{in}n^{in}}$ and $HG_{m^{out}n^{out}}$, respectively.

Now, consider that the transmitter and receiver are misaligned where, misalignment comprises only lateral displacement due to tip/tilt. While misalignment may also comprise linear phase gradients, by symmetry and without loss of generality the same arguments may hold. This can be mathematically described by application of the translation operator:

$$\hat{T}(\Delta\vec{r}|)HG_{m^{out}n^{out}}(x,y)$$

where $\hat{T}(\Delta\vec{r})=\exp(i\Delta\vec{r}\cdot\hat{p}/\hbar)$
$\Delta\vec{r}=\Delta x\hat{x}+\Delta y\hat{y}$,
$\hat{p}=-i\hbar((\partial/\partial x)\hat{x}+(\partial/\partial y)\hat{y})$, and
$\hat{x}$ and $\hat{y}$ are unit vectors in the x and y directions, respectively. At the receiver, the modes are identified by optically realizing the following overlap integral:

$$\int_{-\infty}^{+\infty}dx\int_{-\infty}^{+\infty}dy\, HG_{m^{in}n^{in}}(x,y)\hat{T}(\Delta\vec{r})HG_{in^{out}n^{out}}(x,y) \quad [2]$$

Figure 2A:
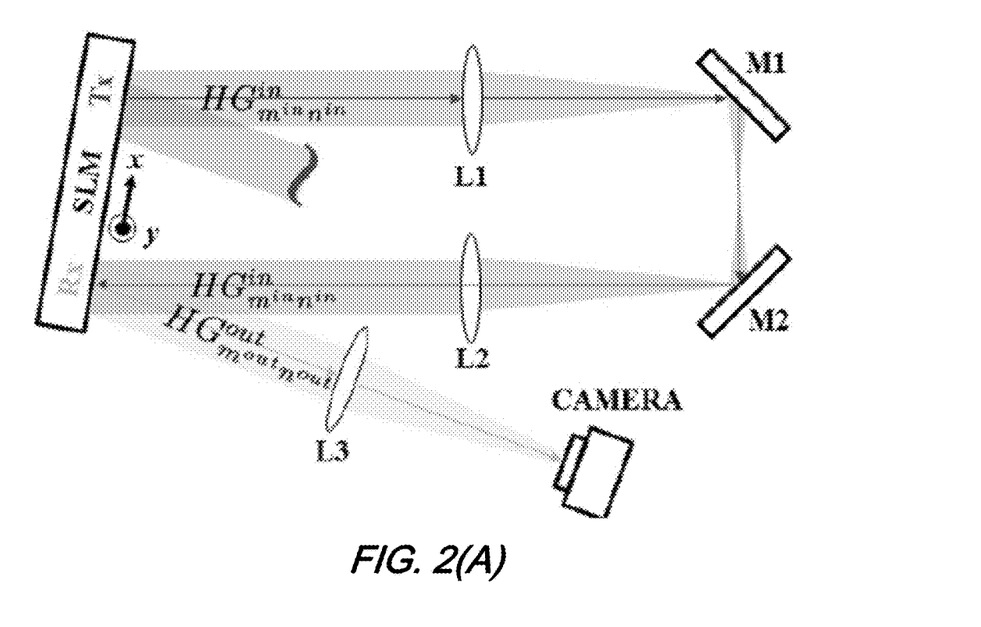
FIG. 2(A) is a schematic diagram of an illustrative experimental setup according to aspects of the present disclosure in which HG and LG modes were generated on one half of the spatial light modulator (SLM) by complex amplitude modulation with transmission function Tx, then imaged and analyzed onto the SLM with holographic filters Rx, the output of the inner-product measurements were recorded as on-axis intensities on a CCD camera according to aspects of the present disclosure.

By way of example we restrict ourselves to a subspace of HG mode with elements $HG_{m0}$ and $HG_{0n}$. We note that phase-only filters as depicted in FIG. 2(A)-2(D) are binary approximations to the Hermite polynomials, and thus can be used for their detection. Importantly, under this binary detection scheme, the arguments of the Hermite polynomials, $\arg[H_{m0}(x)]$ and $\arg[H_{0n}(y)]$, are eigenfunctions of the translation operators $\hat{T}(\Delta y\hat{y})$ and $\hat{T}(\Delta x\hat{x})$, respectively.

$$\hat{T}(\Delta y\hat{y})\arg[H_{m0}(x)]=\mathbb{1}\arg[H_{m0}(x)], \quad [3]$$

$$\hat{T}(\Delta x\hat{x})\arg[H_{0n}(y)]=\mathbb{1}\arg[H_{0n}(y)]. \quad [4]$$

where $\mathbb{1}$ is the identity operator. A graphical illustration of this invariance is given in FIGS. 2(A)-2(D). In FIG. 2(A), spatial modes from the subset $HG_{1,0}$, $HG_{0,1}$ and $LG_{0,-1}$, $LG_{0,+1}$ were generated by complex amplitude modulation with transfer function Tx, encoded on phase only (0–2π) liquid crystal on silicon spatial light modulator (SLM).

The generated modes were imaged, using a 4f imaging lens system L1 and L2, onto the other half of the SLM (receiver) and analyzed using phase-only hologram, whose reference frames were subsequently shifted as shown in in FIGS. 2(B) and 2(C). The dashed circles represent the region of incidence of the generated modes.

Figure 2B:
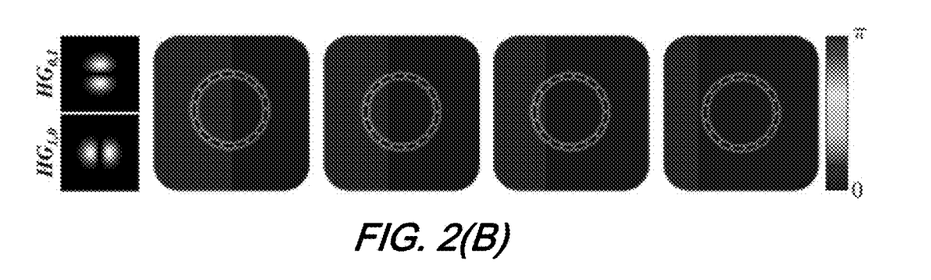
Figure 2C:
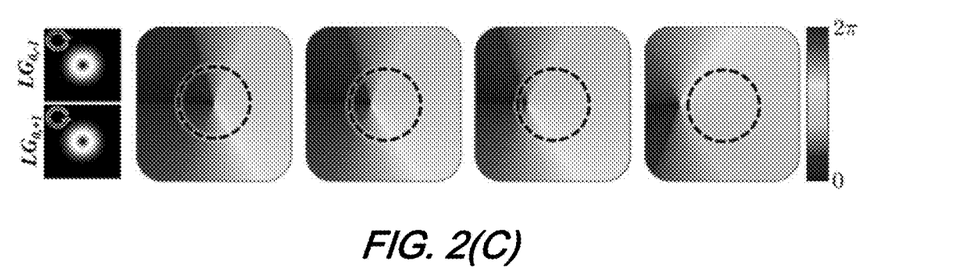
Figure 2D:
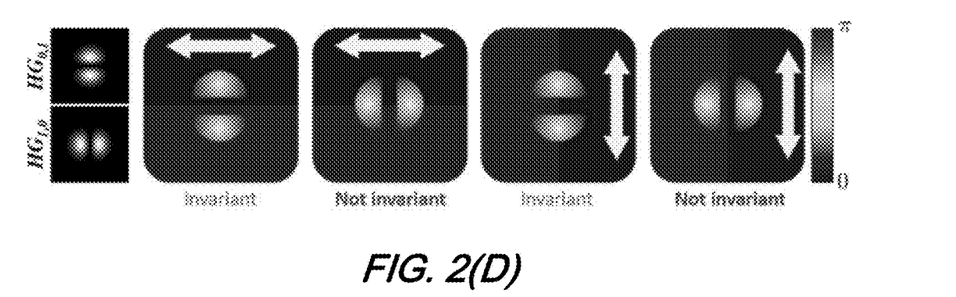
FIG. 2(D) shows the HG modes that match the translation invariant filters Rx along the directions indicated by the white arrows according to aspects of the present disclosure.

We note that the HG phase hologram displayed in FIG. 2(B) is not invariant under translation along the x-direction. However, if the phase pattern of the orthogonal $HG_{10}$ mode shown in FIG. 1(B) was to be translated along the x-direction as shown in FIG. 2(D), the pattern would be invariant as predicted in Eq. 4, making the HG mode $HG_{01}$ an eigenmode of misalignment of the binary detector shifted horizontally. Similarly, for the orthogonal $HG_{10}$ as shown in FIG. 2(D). This is of course within the physical bounds of the detection aperture—as a result of beam divergence—finite apertures smaller than the beam size cause power loss in the spatial mode measured. Here, we will assume is much larger than the beam. In addition, it is trivial from FIGS. 2(A)-2(D), that LG modes are not invariant under any transverse misalignment.

To quantify the effects of lateral misalignment, we define the mode-dependent loss $\mathcal{L}$ and mode crosstalk $\mathcal{C}$ incurred by mode i $$\mathcal{L}_i = 1 - \frac{S_i}{S_0} \quad [5]$$

$$\mathcal{C}_i = 1 - \frac{S_i}{\Sigma_j S_j} \quad [6]$$

where $S_i$ is the power measured in mode i under general offset of the measuring hologram. For a zero-lateral offset, $S_i=S_0$. The power measured in all the modes j when transmitting mode i is expressed as $\Sigma_j S_j$.

Using the experimental setup described above, we measured by modal decomposition, the mode-dependent loss $\mathcal{L}$ and mode-crosstalk $\mathcal{C}$ within the subsets $\{HG_{10}, HG_{01}\}$ and $\{LG_{0,-1}, LG_{0,+1}\}$, as a function of lateral displacement in the x-direction. Comparison of the two mode subsets is 'fair' because they all share an identical beam propagation factor ($M^2$).

Figure 3A:
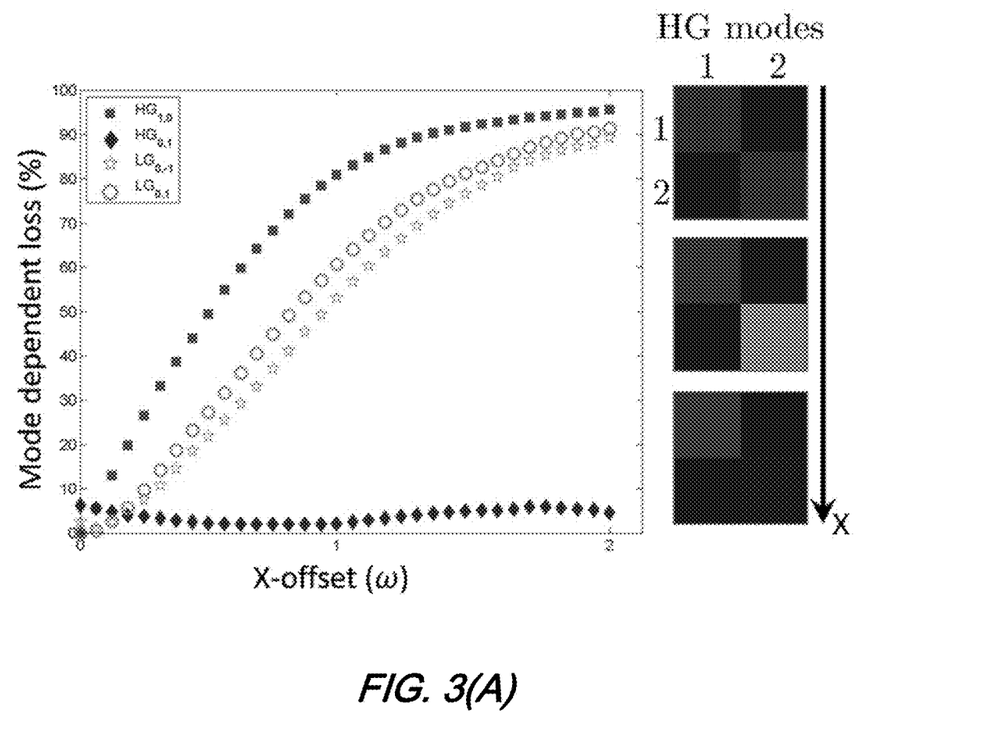
Figure 3B:
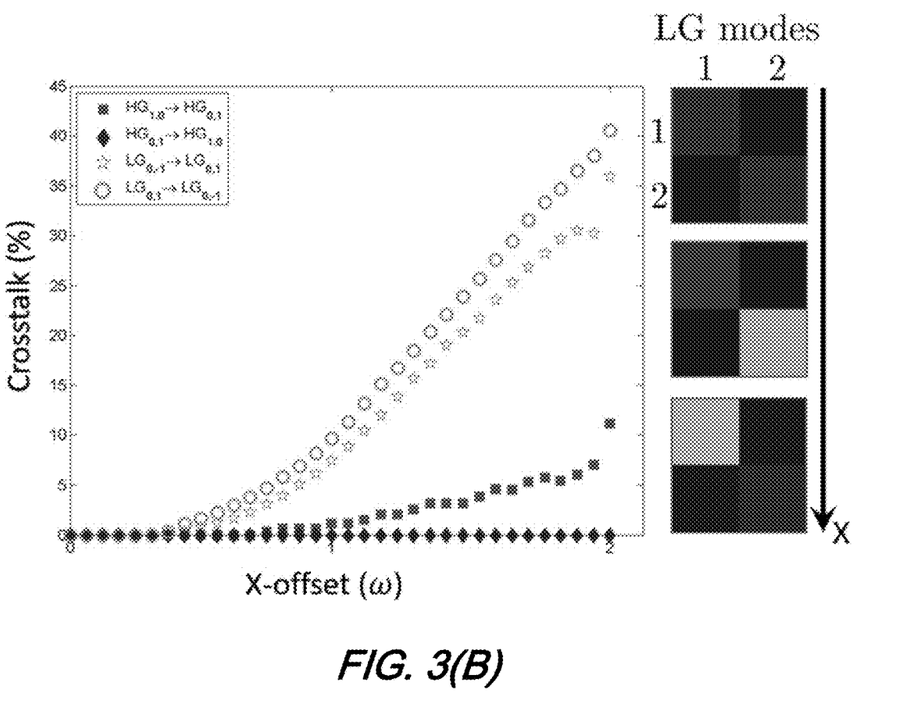
FIG. 3(B) shows the energy transfer between modes as a function of the offset according to aspects of the present disclosure.

As shown in FIG. 3(A) and in accordance with Eq. 4, $HG_{01}$, unlike all the other modes, experiences a constant mode dependent loss that is independent of the lateral offset. In principle, one would expect the mode dependent loss to be zero. The small fluctuations observe are attributed to variation in background noise levels. With regards to mode crosstalk, the expectation was that HG modes would not experience any crosstalk while LG modes would. As shown in FIG. 3(B), there is no measured energy transfer from $HG_{01}$ to $HG_{10}$, while the reverse statement is not true. This however does not contradict the theoretical expectation of zero crosstalk between the HG modes. The reason we measured a non-zero crosstalk was because of the background noise that we measured in the system. Accounting for background noise, for a zero-lateral offset $\Sigma_j S_j \approx S_i$ for a system with relatively good signal-to-noise ratio. As the offset between transmitter and detector increases, i.e., the mode-dependent loss increases, the approximation breaks down and the signal becomes comparable to the noise: $\Sigma_{j\ne i} S_j \sim S_i$. As a consequence, the ratio on the right-hand side of Eq. 6 decreases, resulting in $\mathcal{C}$ increasing.

In recent real-world experiments, it was shown that, over time, OAM modes experience pointing error in all directions. To compare the influence of random misalignment on the mode crosstalk and loss on our two subsets, we modelled the randomness of the offsets with a normal distribution of mean zero and standard deviation (width) σ. Here, the width σ can be physically understood in terms of turbulence strength: the higher the value of σ, the larger the misalignment. In the context of turbulence, larger misalignment translates into higher turbulence strength.

For a given σ, we generated a set of 50 random offsets X such that $X \sim N(0, \sigma^2)$.

Figure 4A:
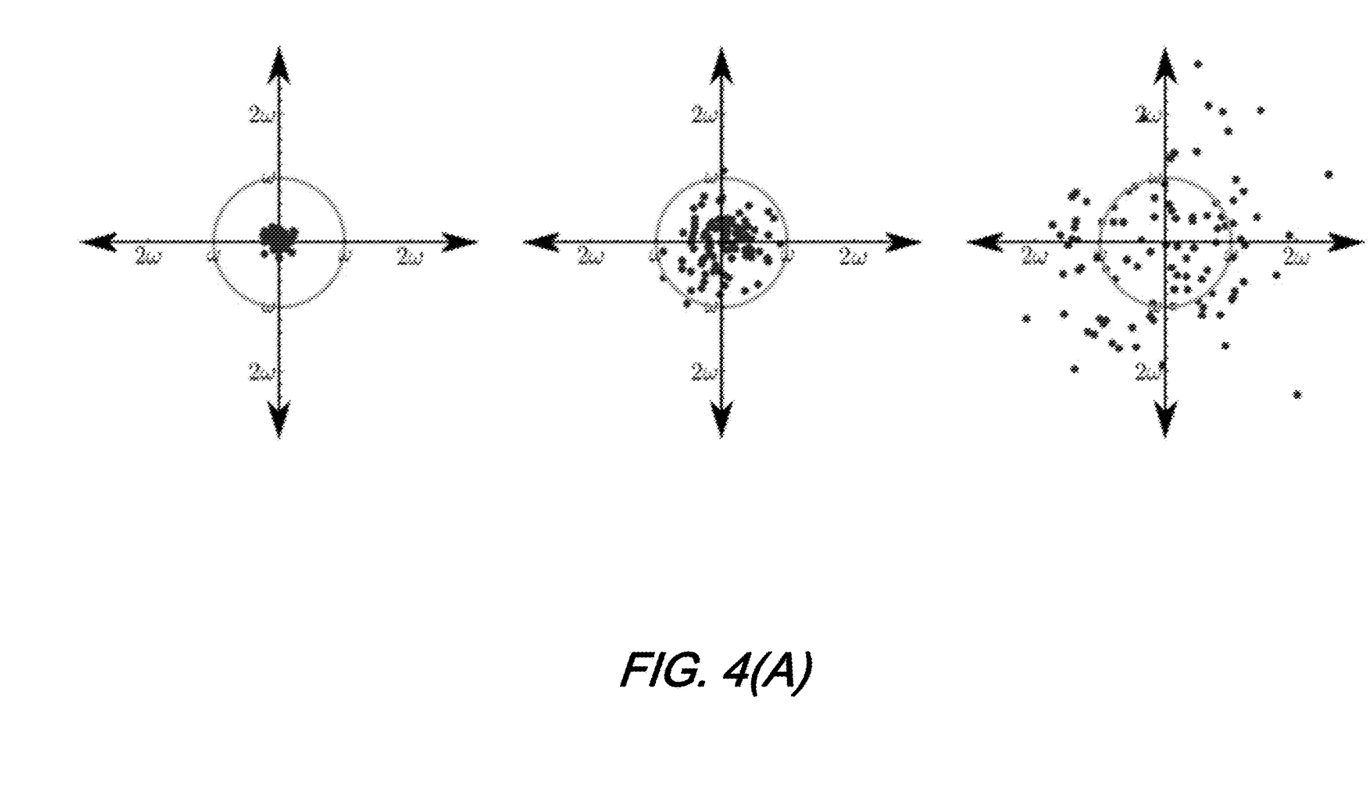
FIG. 4(A) shows the distribution of the offsets around the central axis of the detector within an encoded Gaussian radius for the OAM and HG modes and FIG. 4(B) shows the decay in information signal for the HG and OAM mode subsets with respect to the spread of the distribution of offset points and FIG. 4(C) shows that with respect to random misalignment (lateral offsets at the receiver), the HG modes experience significantly less crosstalk when compared to LG modes, as high as 66% for $\sigma=2\omega$ according to aspects of the present disclosure.
Figure 4B:
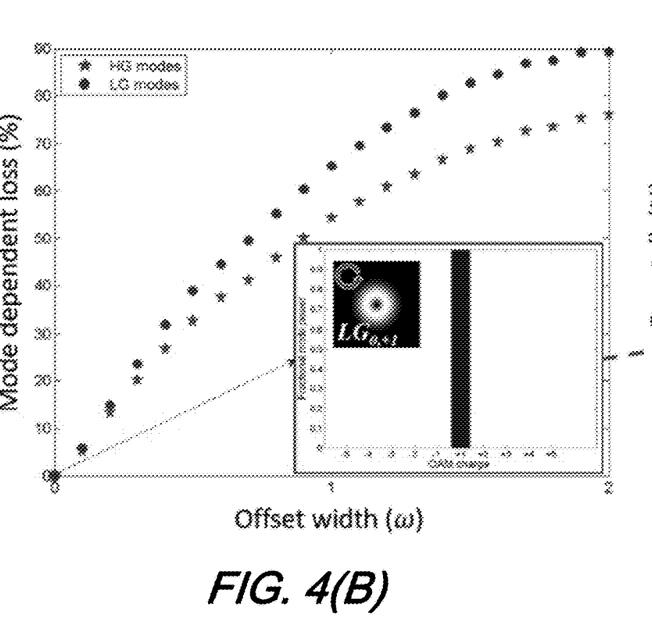
Figure 4C:
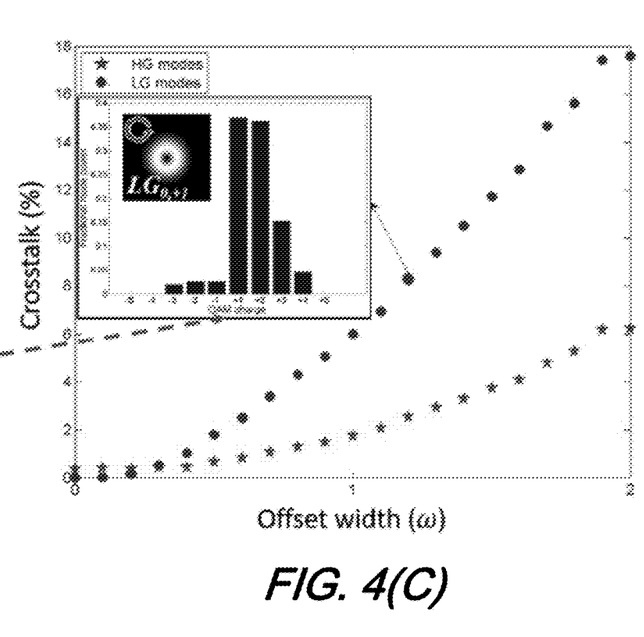

The relation between average mode-dependent loss and the spread σ is shown in FIG. 4(B). Note that the subset of HG modes experiences less average mode crosstalk compared to the LG mode subset, as high as 17% for a σ=2ω where ω=400 μm. FIG. 4(C) shows that with respect to random misalignment (lateral offsets at the receiver), the HG modes experience significantly less crosstalk when compared to LG modes, as high as 66% for σ=2ω.

We believe that this conclusively show that the subset of HG modes described herein is more resilient to misalignment when compared to an equivalent subset of LG modes. As misalignment due to tip/tilt aberrations form a major contributor to turbulence perturbation, we believe that this mode subset of HG modes would be better suited for information transfer where adaptive optics are not available, compared to the equivalent LG mode subset. Interestingly, we note that despite the significant mode-dependent loss (>70%), the highest average crosstalk measured is less than 20% for either mode subset. That is because the measured crosstalk $C$ is normalized with respect to the subspace of interest. However, energy transfer is not limited to a particular subspace. Such is depicted in the insets in FIGS. 4(B) and 4(C).

As an additional example, we chose to analyze the energy transfer between $LG_0$, modes for '=[−5, 5] excluding '=0, for an input $LG_{0,+1}$ mode shown in the insets in FIG. 4. For $\sigma=0$, all the energy is measured in the $LG_{0,+1}$ mode as is expected. With increased offset width ($\sigma\approx1.3\omega$), the energy is distributed among higher order LG modes, while the fractional power difference between the $LG_{0,-1}$ and $LG_{0,+1}$ is relatively high, hence the low average crosstalk value of ~8%.

At this point—and as will be understood by those skilled in the art—we have shown that when experiencing pointing error(s)—as compared with OAM modes—a subset of HG modes experiences less average mode crosstalk and mode dependent loss. As shown, this is due—in part—to a symmetry of the subset with respect to pointing error in some directions. As such we employed HG modes at the generation step with binary phase-only filters as detectors.

Illustrative System, Method, and Structures

Figure 5:
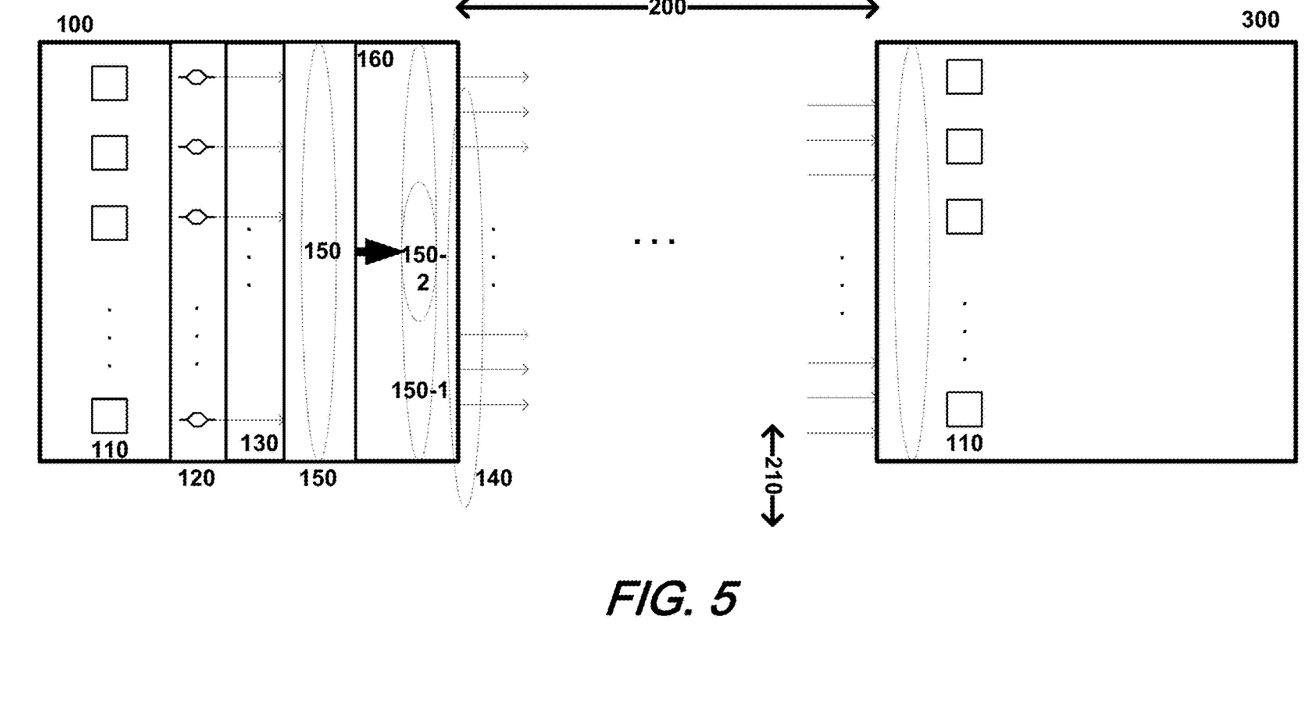
FIG. 5 is a schematic diagram of an illustrative free-space optical communications system employ Hermite-Gaussian modes according to aspects of the present disclosure.

With these theoretical underpinnings in place, we turn our attention now to FIG. 5—which shows a schematic diagram of an illustrative free-space optical communications system employing Hermite-Gaussian modes according to aspects of the present disclosure.

As may be observed from that figure, an end-to-end free-space optical communications system according to aspects of the present disclosure will generally include a data transmitter (100) in optical communications with a data receiver (300) using a free-space channels (200) to convey optically transmitted data.

According to aspects of the present disclosure, the data transmitter transmits N Hermite-Gaussian modes (150-1), which advantageously carry N independent data streams (140), over the free-space channel to the data receiver where, they are detected.

As will be understood by those skilled in the art—transmission via the free-space channel causes the N Hermite-Gaussian modes to become laterally misaligned (210) with respect to the data receiver. Note that the N Hermite-Gaussian modes can be of a subset of Hermite-Gaussian modes (150-2) where, the indices of each Hermite-Gaussian mode are given by m=0 and n≠0 or, m≠0 and n=0. When laterally misaligned, the subset of Hermite-Gaussian modes (150-2) experiences less mode crosstalk and, in turn, less data errors.

According to aspects of the present disclosure, data transmitter (100) will include N modulators (120) that are used to modulate light output from N lasers (110) and thereby generate N data streams (signals) (130). A mode multiplexer (140) converts the N data streams (130) into N Hermite-Gaussian modes (150) and combine them into a single laser beam. The N Hermite-Gaussian modes (150) are then expanded and collimated and, transmitted over a free space channel (200) using appropriate optics (160).

We note at this point that while we have described and explicitly shown N-lasers, there are configurations contemplated wherein M-lasers are employed to generate the N-data streams through the effect of N-modulators. Note further that the mode multiplexer(s) employed may comprise liquid crystal spatial light modulators, digital micromirror spatial light modulators, photonic lanterns, core to core optical fiber coupling, multi-plane light conversion, and crystal q-plates. Finally, such mode multiplexer(s) may be included in the receiver(s) as well as the transmitter(s).

Figure 6:
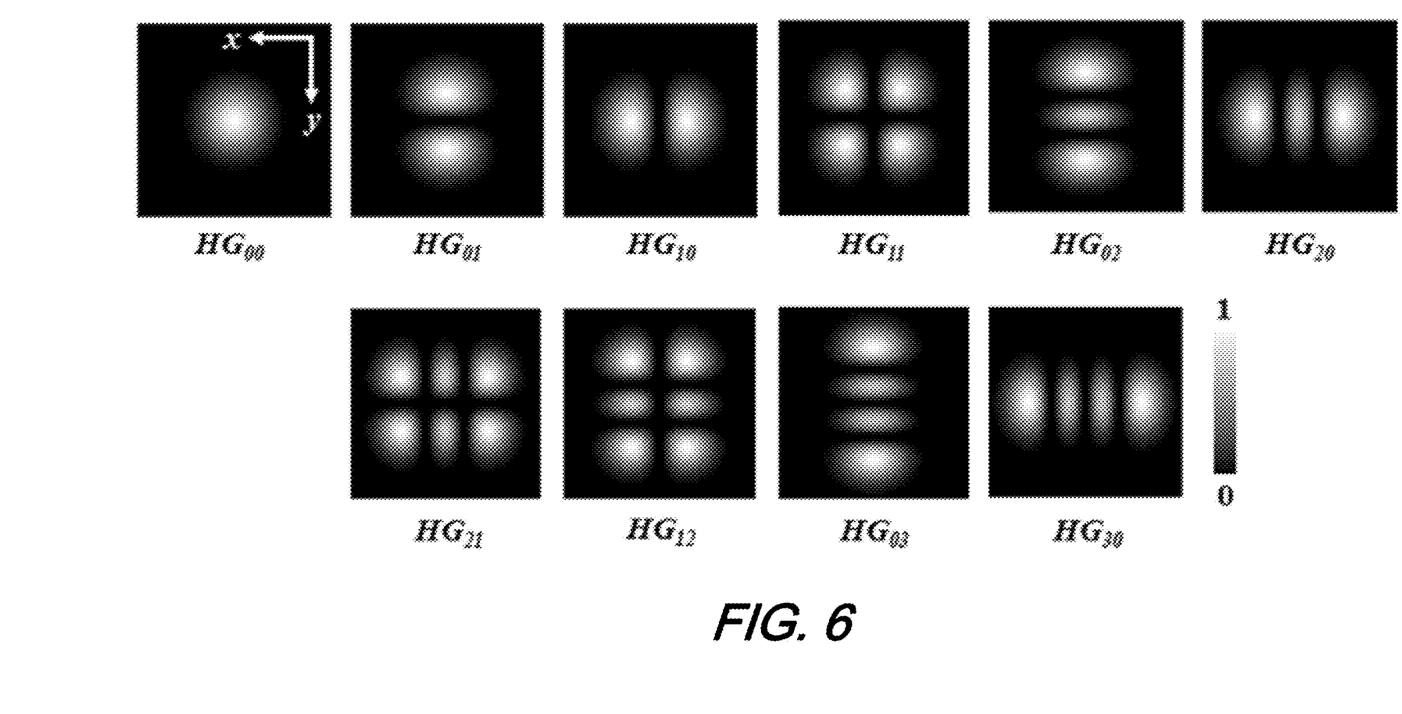
FIG. 6 is a series of plots of the intensities of $HG_{00}$, $HG_{10}$, $HG_{01}$, $HG_{11}$, $HG_{02}$, $HG_{20}$, $HG_{21}$, $HG_{12}$, $HG_{03}$, and $HG_{30}$, Hermite-Gaussian modes as given by equation 7 according to aspects of the present disclosure.

As previously noted, the N Hermite-Gaussian modes (150) are spatial patterns of light where the pattern is perpendicular to the light's direction of propagation which is given by z. These spatial patterns are solutions to an electromagnetic wave equation in rectangular coordinates (x,y,z). At z=0, the amplitudes of Hermite-Gaussian modes are given by the equation:

$$HG_{mn}(x, y) = c_{mn} H_m\left(\frac{x\sqrt{2}}{w}\right) H_n\left(\frac{y\sqrt{2}}{w}\right) \exp\left(\frac{-x^2 - y^2}{w^2}\right), \quad (7)$$

where $c_{mn}$ are normalized coefficients, $H_m(\ldots)$ and $H_n(\ldots)$ are Hermite polynomials, w is the waist size of the modes, and m and n are indices of the Hermite-Gaussian modes corresponding to the x and y directions, respectively, where m, n=0,1,2, . . . For example, plots of the intensities of $HG_{00}$, $HG_{10}$, $HG_{01}$, $HG_{11}$, $HG_{20}$, $HG_{02}$, $HG_{12}$, $HG_{21}$, $HG_{30}$, $HG_{03}$, which are given by $|HG_{mn}(x, y)|^2$, are shown in FIG. 6.

Note that the N Hermite-Gaussian modes (150-1) can be any of all Hermite-Gaussian modes. For example, plots of the intensities of N=10 Hermite-Gaussian modes ($HG_{10}$, $HG_{01}$, $HG_{20}$, $HG_{02}$, $HG_{30}$, and $HG_{03}$) which are comprised of the Hermite-Gaussian modes described in Equation 7 are shown in FIG. 6. In particular configurations, any data transmitted from transmitter to receiver as shown in FIG. 5 will only be conveyed via the Hermite-Gaussian modes.

Figure 7:
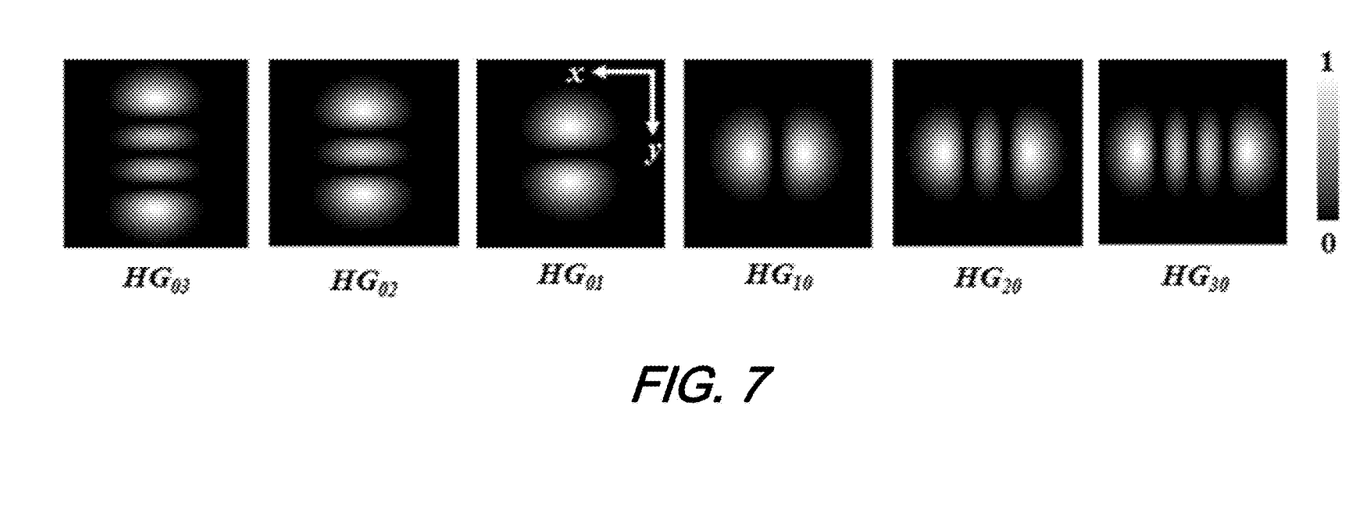
FIG. 7 is a series of plots of the intensities of $HG_{10}$, $HG_{01}$, $HG_{20}$, $HG_{02}$, $HG_{30}$, and $HG_{03}$, Hermite-Gaussian modes that are part of a special subset of Hermite-Gaussian modes described by Equation 8 according to aspects of the present disclosure.

The N Hermite-Gaussian modes can be a special subset (150-2) of Hermite-Gaussian modes given by:

$$\{HG_{m0}(x,y), HG_{0n}(x,y)\}, \quad (8)$$

where the indices of each Hermite-Gaussian mode are given by m=0 and n≠0 or, m≠0 and n=0. For example, plots of the intensities of N=6 Hermite-Gaussian modes ($HG_{10}$, $HG_{01}$, $HG_{20}$, $HG_{02}$, $HG_{30}$, and $HG_{03}$) which are part of the subset of Hermite-Gaussian modes described in Equation 8 are shown in FIG. 7.

We note that the free space channel (200) can be any air, outer space, vacuum, or something similar—including the Earth's atmosphere. For example, the free space channel can be between two ground stations, between two moving or stationary ground vehicles, two moving or stationary aerial vehicles or, any combination thereof. The free space channel can also be outer space. For example, the free space channel can be between two man-made satellites or spacecraft, between two planets, between a planet and a moon, or a combination thereof. The free space channel can also be a combination of Earth's atmosphere and outer space. For example, the free space channel can be between a man-made satellite or spacecraft and a ground station.

We note that the data transmitter and/or data receiver—according to aspects of the present disclosure—may be advantageously mounted or otherwise included on a drone, aerial vehicle, balloons, satellite, helicopter, etc or any other structure that may advantageously benefit from the ability of systems according to the present disclosure to be less susceptible to mis-alignment as a result of their utilization of HG modes—and in particular, exclusive use of HG modes and/or subsets thereof for data transmission.

The lateral misalignment (210) is generally caused from the free-space channel which results in the lateral misalignment of the N Hermite-Gaussian modes. Lateral misalignment can due to atmospheric turbulence or mechanical movement of the data transmitter (100) and/or the data receiver (300).

As will be understood and appreciated, at the receiver the N Hermite-Gaussian modes are received from the free-space channel(s) and optionally imaged using receiver imaging optics. The N Hermite-Gaussian modes may be separated into N paths, and N data signals using the mode multiplexer. Such N Hermite-Gaussian modes comprising the N data signals may be advantageously detected at the receiver by N photodetectors.

At this point, while we have presented this disclosure using some specific examples, those skilled in the art will recognize that our teachings are not so limited. Accordingly, this disclosure should be only limited by the scope of the claims attached hereto.

The invention claimed is:

1. A free-space optical communications system comprising:
   a data transmitter;
   a data receiver; and
   a free-space channel optically connecting the data transmitter to the data receiver;
   the data transmitter including:
   N-lasers that generate N-laser beams;
   N-modulators that modulate the N-laser beams producing N-data streams;
   a mode multiplexer that converts the N-data streams into N-Hermite-Gaussian modes and combine them into a single laser beam for transmission over the free-space channel to the data receiver;
   wherein the N-Hermite-Gaussian modes are spatial patterns of light that are perpendicular to the light's direction of propagation;
   wherein the spatial patterns are solutions to an electromagnetic wave equation in rectangular coordinates (x, y, z), and at z=0, and amplitudes of Herrnite-Gaussian modes are given by the equation:

$$HG_{mn}(x, y) = c_{mn} H_m\left(\frac{x\sqrt{2}}{w}\right) H_n\left(\frac{y\sqrt{2}}{w}\right) \exp\left(\frac{-x^2 - y^2}{w^2}\right),$$

where $c_{mn}$ are normalized coefficients, $H_m$ ( . . . ) and $H_n$ ( . . . ) are Hermite polynomials, w is a waist size of the modes, and m and n are indices of the Hermite-Gaussian modes corresponding to the x and y directions, respectively, where m, n=0,1, 2, . . . ;
   wherein the N-Hermite-Gaussian modes are a special subset of the Hermite-Gaussian modes and are given by the equation:

[$HG_{m0}(x,y)$, $HG_{0n}(x,y)$], where the indices of each Hermite-Gaussian mode are given by m=0 and n≠0 or, m≠0 and n=0; and
   wherein N is greater than 2.

2. The system of claim 1 wherein the free-space channel includes one or more selected from the group consisting of: an Earth's atmosphere, and outer space.

3. The system of claim 1 wherein the free-space channel introduces a lateral misalignment in the N-Hermite-Gaussian modes.

4. The system of claim 3 wherein the lateral misalignment in the N-Hermite-Gaussian modes is due to atmospheric turbulence or mechanical movement of the data transmitter and/or data receiver.

5. The system of claim 1 wherein the N-Hermite-Gaussian modes are conveyed via the free-space channel as N-data signals.

6. The system of claim 1 wherein the data receiver includes N receiver photodiodes.

7. The system of claim 1 where the mode multiplexer of the data transmitter comprises one selected from the group consisting of: liquid crystal spatial light modulators, digital micromirror spatial light modulators, photonic lanterns, core to core optical fiber coupling, multi-plane light conversion, and liquid crystal q-plates.

8. The system of claim 1 wherein a mode multiplexer of the data receiver comprises one selected from the group consisting of liquid crystal spatial light modulators, digital rnicromirror spatial light modulators, photonic lanterns, core to core optical fiber coupling, multiplane light conversion, and liquid crystal q-plates.

9. The system of claim 1 where at least one of the data transmitter and the data receiver are mounted on an unmanned aerial vehicle, selected from the group consisting of: aerial balloons, satellites, drones, helicopter drones.

10. The system of claim 1 wherein the N-data streams are transmitted only via Herrnite-Gaussian modes.

11. The system of claim 1 wherein the data receiver and the data transmitter are mis-aligned.

12. A free-space optical communications method comprising:
   generating, through the effect of N-lasers, N-laser beams;
   modulating, through the effect of N-modulators, the N-laser beams to produce N-data streams;
   converting, through the effect of a mode multiplexer, the N-data streams into N-Hermite-Gaussian modes and combining them into a single laser beam for transmission over a free-space channel to a data receiver; and
   transmitting the N-data streams via the N-Hermite-Gaussian modes to the data receiver;
   wherein the N-Hermite-Gaussian modes are spatial patterns of light that are perpendicular to the light's direction of propagation;
   wherein the spatial patterns are solutions to an electromagnetic wave equation in rectangular coordinates (x, y, z,), and at z=0, and amplitudes of Hermite-Gaussian modes are given by the equation:

$$HG_{mn}(x, y) = c_{mn} H_m\left(\frac{x\sqrt{2}}{w}\right) H_n\left(\frac{y\sqrt{2}}{w}\right) \exp\left(\frac{-x^2 - y^2}{w^2}\right),$$

where $c_{mn}$, are normalized coefficients, $H_m$ ( . . . ) and $H_n$ ( . . . ) are Hermite polynomials, w is a waist size of the modes, and m and n are indices of the Hermite-Gaussian modes corresponding to the x and y directions, respectively, where m, n=0,1, 2, . . . ;
   wherein the N-Hermite-Gaussian modes are a special subset of the Hermite-Gaussian modes and are given by the equation:

[$HG_{m0}(x,y)$, $HG_{0n}(x,y)$], where the indices of each Hermite-Gaussian mode are given by m=0 and n≠0 or, m≠0 and n=0; and
wherein N is greater than 2.

13. The method of claim 12 wherein the N-data streams are transmitted exclusively via the N-Hermite-Gaussian modes.

* * * * *